April 26, 1966   P. BARTON   3,247,982
APPARATUS FOR STORING AND HANDLING ARTICLES
Filed Nov. 2, 1964   2 Sheets-Sheet 1
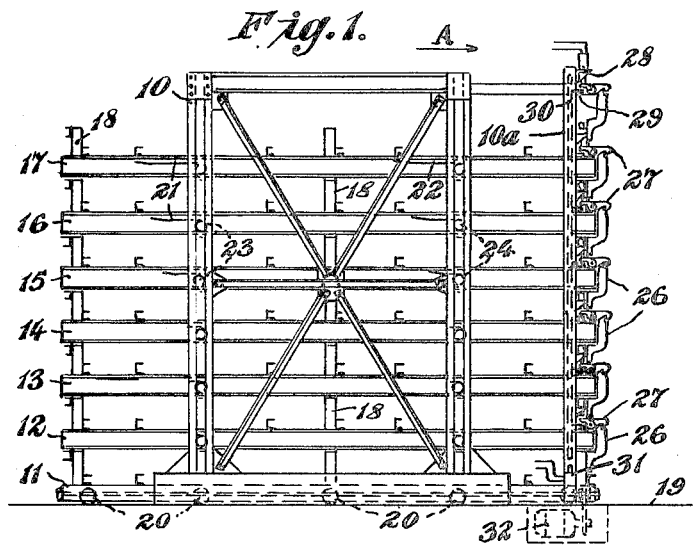
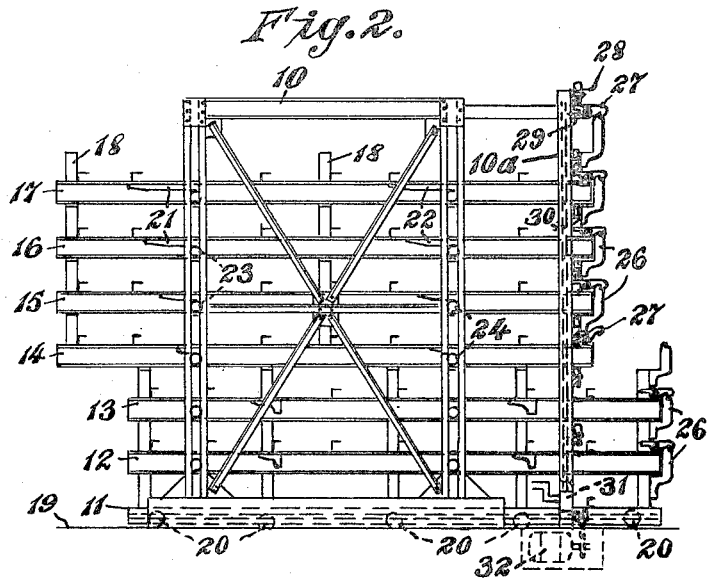

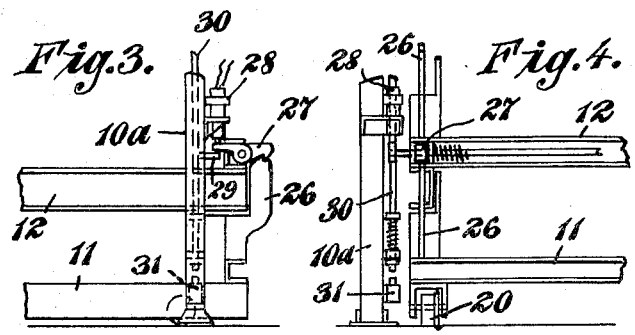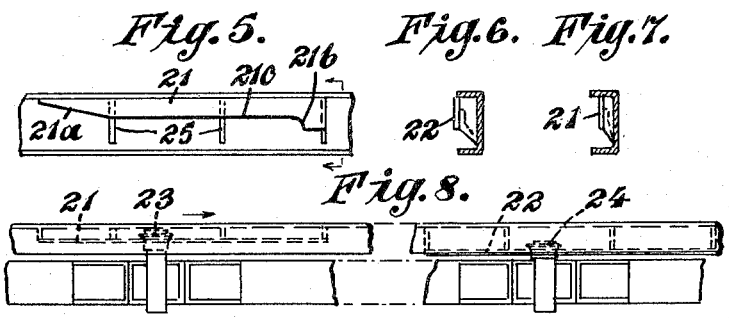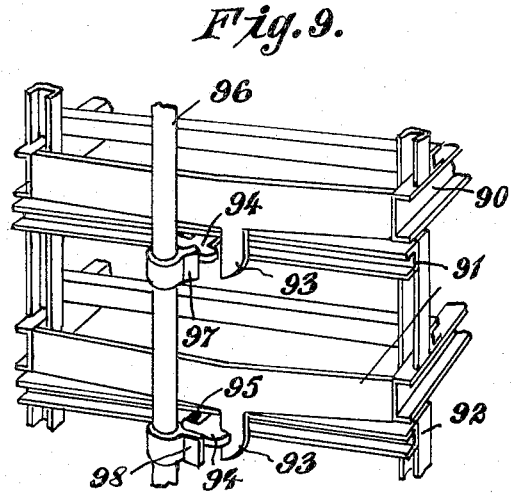

United States Patent Office 3,247,982
Patented Apr. 26, 1966

3,247,982
APPARATUS FOR STORING AND HANDLING ARTICLES
Peter Barton, Edgbaston, Birmingham, England, assignor to B. C. Barton & Son Limited, Tipton, England, a British company
Filed Nov. 2, 1964, Ser. No. 408,178
Claims priority, application Great Britain, Nov. 5, 1963, 43,619/63
13 Claims. (Cl. 214—6)

This invention relates to apparatus for storing and handling articles and is particularly concerned with such apparatus of the kind in which a series of skeleton or solid supporting structures (hereinafter called "pallets") are arranged in a framework one above the other in a manner analogous to a chest of drawers and in which means are provided permitting any one drawer (i.e. a pallet) together with those drawers below it in the chest (i.e. the framework) to be moved outwardly from the chest so as to permit the contents of the top one of the drawers which are moved to be accessible, and to be returned into the chest when desired.

The object of the present invention is to provide apparatus of this kind which is relatively simple and economical to construct.

In accordance with the present invention apparatus for storing and handling articles comprises a plurality of sepparate pallets housed in a framework, means provided on the framework and pallets for spacing the latter one above the other in the framework, and means for extending from and retracting into the framework any one pallet together with those disposed below that pallet.

The invention further consists in apparatus for storing and handling articles comprising a plurality of superimposed pallets located in a framework, guide means for constraining the pallets during movement into and out of the framework, and means for moving said pallets as aforesaid, wherein said guide means are arranged and disposed on the pallets and framework so that during said movement the pallets are successively lifted or lowered according to the direction of movement, the uppermost of the moved pallets being lifted first and lowered last also according to the direction of movement.

The invention also consists in apparatus for storing and handling articles comprising a plurality of superimposed pallets spaced apart from one another in a framework, separate catch means engaging each pallet and retaining it stationary relative to the next adjacent pallet, selector means for individually releasing any one catch means, means for moving the pallets including the lowermost one and those superimposed thereon up to and including the pallet of which the catch has been released, into and out of the framework, and means disposed on the pallets and framework for automatically lifting the uppermost moved pallet off the next and so on down the stack during movement into the framework, and vice versa.

One practical embodiment of the invention will now be more particularly described with reference to the accompanying drawings, wherein:

FIG. 1 is an elevation of one unit;
FIG. 2 is a view similar to FIG. 1 but showing the unit part operated;
FIGS. 3–8 are various detail views on larger scales which will be more particularly referred to hereinafter; and
FIG. 9 is a detail view of a modification.

Referring first to FIGS. 1 and 2, the unit shown therein is adapted for storing and handling bulky and heavy articles, e.g. up to several tons in weight and perhaps 20 feet in length: the unit comprises a stationary frame 10 having two parallel parts, only one of which is seen in the drawings, and between which is located a stack of superimposed pallets 11–17. Each pallet comprises a girder-like skeleton frame which may have side and end walls and a base, or material supports such as 18 depending entirely upon the intended purpose of the unit. For example if lengths of metal strip, tube or section are to be carried and stored, supports 18 may be saddle-shaped; if smaller articles such as parts, patterns, press tools or the like are to be stored, then side and end walls as well as bases will be provided.

The unit is built on a solid foundation and at ground level 19 a runway or track (not shown) is provided and the bottom pallet 11 has wheels 20 engaging said track. The pallets, when in the framework, are all spaced apart by small distances, and during movement out of the framework, in the direction of arrow A (FIG. 1), the pallet 12 if moved will lower on to pallet 11, pallets 13 on to pallet 12 and so on. In returning inwardly the sequence is reversed, i.e. the top pallet is lifted off the remainder and then the next highest pallet is lifted off and so on.

The means for causing said lifting and lowering are illustrated in FIGS. 1, 2, and 5–8, and comprise a pair of spaced ramps 21, 22 shown in elevation in FIG. 5 and in plan in FIG. 8, provided on each side of each pallet and engaging rollers 23, 24 respectively carried by the framework. Ramps 21 are located offset but in parallel planes to ramps 22 so that when ramp 21 is clear of roller 23 and passes roller 24 it will be clear of that roller. The rollers have headed or flanged ends to engage behind the ramps and the latter are carried on slotted brackets 25 for this purpose as shown in the two sectional views FIGS. 6 and 7; this is to provide a better location and lateral strength.

Each ramp such as 21, FIG. 5, comprises a nose 21a, a stop shoulder 21b and an interconnecting flat or straight portion 21c. The ramps on opposite sides of each pallet are aligned in pairs and up the height of the apparatus the ramps differ in the length of the portions 21c and also in the length of the ramp noses in order to ensure that the amount of lift diminishes in proportion from top to bottom of the stack. This is to achieve a clearance between pallets when they are resting on their respective rollers in the framework and so allow for any deflection in the pallets due to the weight of their contents.

Hence the positions of noses 21a varies since shoulders 21b are all vertically aligned when the apparatus is in the FIG. 1 position. Thus the ramps of the top pallet 17 have the longest straight portions 21c whilst those of the second lowest pallet 12 have the shortest (or indeed no straight portion): pallet 11 does not have any ramps.

Hence, assuming that the bottom three pallets are displaced as in FIG. 2, the movement of the three as a whole will continue with the respective rollers rolling along the straight portions of all the ramps until the rollers meet the noses 21a of the ramps of pallet 12 (in actual fact this will happen after a very short travel) when the ramps will permit the pallet 12 to lower onto pallet 11. Shortly after this the noses of the ramps on pallets 13 will similarly lower that on to pallet 12 and the three pallets will form a single unit as they continue outwards.

During retraction the reverse procedure follows, and pallet 13 will first lift off pallets 11 and 12, and then pallet 12 will lift off pallet 11.

The selector and catch mechanism illustrated which controls the number of pallets which are moved will now be described: referring particularly to FIGS. 1–3 each pallet 11–17 has a fixed catch member 26 respectively, and each pallet except the lowest pallet 11 carries a pivoted hook-like member 27 which co-operates with the catch member 26. Above the uppermost pallet 17 a further hook-like member 27 is mounted on the framework 10 to co-operate with the uppermost catch member 26. As best seen in FIG. 3 each hook-like member is pivoted centrally and one end abuts a corresponding solenoid 28 on its upper surface, and an abutment 29 on its lower surface. Each abutment is fast with a rod 30 (FIG. 4) guided in brackets carried by a frame member 10a and the rod and frame member 10a are stationary relative to the pallets and are located to one side thereof as seen in FIG. 4. The rod 30 is spring urged upwardly, and at its lower end is associated with a switch 31.

Each of the solenoids is associated with a selector switch or respective buttons or other means (not shown) whereby any one solenoid can be energised. Whichever solenoid is energised the corresponding hook-like member 27 is pivoted thereby to disengage from its complementary catch member 26. Simultaneously the corresponding abutment 29 is depressed by the solenoid via the interposed portion of the hook-like member thus causing the rod 30 (and incidentally all other abutments 29) to move axially so as to operate switch 31. This may prepare motor 32 (FIG. 1) for operation or if desired cause operation thereof.

The motor 32 may be connected to the lowest pallet 11 by an convenient means such as a chain, rack and pinion or worm gear transmission, so that the pallet 11 is driven outwardly of the frame for the limit of the transmission, and then stopped. Suitable micro switches may stop the motor at a suitable point.

Because of the co-operating catches, each superimposed pallet which is still connected to pallet 11 will be moved with the latter: thus if the solenoid on pallet 14 is operated the latter will be disconnected from pallet 13 by the hook-like member 27 disengaging from its associated catch member 26. Then pallets 11–13 inclusive will move as one unit whilst pallets 14–17 remain stationary, as illustrated in FIG. 2.

The uppermost one of the displaced pallets is open for inspection or addition to or removal from its article storage surfaces.

After any article handling has been carried out, the displaced pallets are returned by actuating the motor 32 either after reversal or use of reverse gearing.

It will be appreciated that a very simple control circuit is all that is necessary to enable any one desired pallet to be brought out of the frame and subsequently returned, although in every case the pallets below the one required are likewise brought out and returned.

Many variations are clearly possible; for example the pallets may be moved by rams or rams and chains or cables; furthermore the system for elevation and lowering each pallet by a small fraction and with the load spread by arranging that each pallet is moved vertically at a different time from the other pallets, is also susceptible of variation—most obviously by placing the ramps on the frame instead of on the pallets, and using rollers on the pallets instead of the frame but other changes are also possible.

Further, instead of using the solenoid and catch arrangement such as is illustrated in FIGS. 1–8, a purely mechanical arrangement is possible as illustrated in FIG. 9. In this arrangement each pallet 90, 91, 92 has a downwardly projecting tongue 93 at its rear end and the next lowest pallet in each case carries a pivoted catch 94, spring 95 urged to engage behind the tongue so as to lock the two pallets (in each case) together. A rod 96 is mounted on the frame for rotation and carries a series of operating lugs 97, 98 which, when viewed in plan are equi-angularly and regularly spaced about less than 360°: hence the rod is turned for a predetermined amount so that one lug only engages with a corresponding catch, according to the angle through which the rod is turned, and that catch is released as shown at the upper part of FIG. 9, whilst all other catches remain engaged. Consequently the pallets below the disengaged catch are movable as one unit and those above that catch remain behind as one unit.

I claim:

1. Apparatus for storing and handling articles comprising a plurality of separate pallets, a stationary framework for housing the pallets, means on the framework for supporting in spaced relation those pallets above the lowermost pallet, and means actuated upon withdrawal from the framework of a consecutive series of the pallets, including the lowermost pallet, for lowering each of the overlying pallets in the series from the supporting means onto the pallet next below, to cause the series of pallets to be withdrawn as a stack resting on the lowermost pallet.

2. Apparatus according to claim 1 wherein a separate catch is provided for securing each pallet against horizontal movement relative to the next underlying pallet, and individual means are provided for separately releasing such catch to cause the next underlying pallet and any intervening pallets to be withdrawn when the lowermost pallet is withdrawn.

3. Apparatus according to claim 2 wherein the individual means for separately releasing each catch comprises a solenoid.

4. Apparatus according to claim 2 wherein the individual means for separately releasing each catch comprises a selectively rotatable rod.

5. Apparatus for storing and handling articles comprising a plurality of separate pallets, a stationary framework for housing the pallets, means on the framework for supporting in spaced relation those pallets above the lowermost pallet, and means actuated, upon horizontal movement into the framework of a stack of the pallets, for transferring to the supporting means the weight of each of the overlying pallets in consecutive order beginning with the uppermost pallet in the stack.

6. Apparatus according to claim 5 wherein a separate catch is provided for securing each pallet against horizontal movement relative to the next underlying pallet during transfer of the weight of the pallets to the supporting means.

7. Apparatus for storing and handling articles comprising a plurality of separate pallets, a stationary framework for housing the pallets, separate means on the framework for receiving and supporting, in spaced relation to the other pallets, each of the pallets above the lowermost pallet, and means on each pallet for engaging such receiving means, one of the aforementioned means comprising rollers, and the other comprising ramps for raising the corresponding pallet into such spaced relation as a stack of the pallets is moved horizontally into the framework.

8. Apparatus according to claim 7 wherein the receiving means on the framework comprises rollers and the engaging means on the pallets comprise ramps.

9. Apparatus according to claim 8 wherein each pallet is provided with a plurality of ramps which are spaced longitudinally along the pallet and are disposed in different vertical longitudinal planes.

10. Apparatus according to claim 7 wherein the rollers and ramps are arranged to raise the pallets, as a stack of the pallets is moved horizontally into the framework, in consecutive order beginning with the uppermost pallet in the stack.

11. Apparatus according to claim 7 wherein a separate catch is provided for securing each pallet, as it is raised by the ramps, against horizontal movement relative to the next underlying pallet.

12. Apparatus according to claim 11 wherein individual means are provided for separately releasing each catch to cause the next underlying pallet and any intervening pallets to be withdrawn when the lowermost pallet is withdrawn.

13. Apparatus for storing and handling articles comprising a plurality of separate movable pallets, a stationary framework having means thereon for supporting a plurality of pallets, and means actuated upon withdrawal from the framework of a consecutive series of the pallets for lowering the pallets previously supported by the supporting means, to cause the series of pallets to be withdrawn as a stack of pallets, said means also being actuated, upon return movement into the framework of the pallets previously supported by the supporting means, for retransferring the weight of such pallets to the supporting means.

References Cited by the Examiner

UNITED STATES PATENTS

| | | | |
|---|---|---|---|
| 469,289 | 2/1892 | Walton | 214—16.4 X |
| 2,769,559 | 11/1956 | Johnson | 214—16.4 |
| 2,835,547 | 5/1958 | Erismann | 312—219 |
| 3,033,391 | 5/1962 | Schubert | 214—16.4 |
| 3,053,403 | 9/1962 | Barton | 214—16.4 |
| 3,063,769 | 11/1962 | Graber et al. | 312—223 |
| 3,075,656 | 1/1963 | Pearne | 214—16.4 |
| 3,087,634 | 4/1963 | Cornell et al. | 214—16.4 |
| 3,175,722 | 3/1965 | Paulssen | 214—16.4 X |

FRANK B. SHERRY, *Primary Examiner.*

G. O. FINCH, *Assistant Examiner.*